United States Patent [19]

Russell et al.

[11] Patent Number: 4,557,330

[45] Date of Patent: Dec. 10, 1985

[54] MISCIBLE FLOODING WITH DISPLACING FLUID CONTAINING ADDITIVE COMPOSITIONS

[75] Inventors: Delbert D. Fussell; William F. Yellig, Jr., both of Tulsa, Okla.

[73] Assignee: Standard Oil Company, Chicago, Ill.

[21] Appl. No.: 740,313

[22] Filed: Jun. 3, 1985

Related U.S. Application Data

[63] Continuation of Ser. No. 511,041, Jul. 5, 1983, abandoned.

[51] Int. Cl.4 .............................................. E21B 43/22
[52] U.S. Cl. ..................................... 166/274; 166/273
[58] Field of Search ............................... 166/273–275; 252/8.55 D

[56] References Cited

U.S. PATENT DOCUMENTS

| | | | |
|---|---|---|---|
| 2,822,872 | 2/1958 | Rzasa et al. | 166/273 |
| 3,231,018 | 1/1966 | Handy | 166/252 |
| 3,623,552 | 11/1971 | Vairogs | 166/274 |
| 3,811,501 | 5/1974 | Burnett et al. | 166/274 X |
| 3,811,503 | 5/1974 | Burnett et al. | 166/274 X |
| 3,885,628 | 5/1975 | Reed et al. | 166/274 X |

OTHER PUBLICATIONS

Henry et al., "Multiple Phase Generation During $CO_2$ Flooding", paper No. SPE 8812, 1980.

Primary Examiner—George A. Suchfield
Attorney, Agent, or Firm—Robert R. Cochran

[57] ABSTRACT

A method for displacing hydrocarbons from a hydrocarbon-bearing subterranean reservoir by injecting a displacing fluid comprising a primary fluid such as carbon dioxide or rich gas, and an additive such as nitrogen, methane, flue gas, propane, butane, LPG, hydrogen sulfide, carbon monoxide, and mixtures thereof, said additive having a concentration sufficient to adjust the phase equilibrium of mixtures of the displacing fluid with reservoir hydrocarbons. The additive adjusts the phase equilibrium so that utilization of the displacing fluid is more efficient.

8 Claims, 2 Drawing Figures

MISCIBLE FLOODING WITH DISPLACING FLUID CONTAINING ADDITIVE COMPOSITIONS

CROSS-REFERENCE TO RELATED APPLICATION

This is a continuation of application Ser. No. 511,041 filed July 5, 1983, now abandoned.

1. Field of the Invention

This invention relates to enhanced recovery of hydrocarbons from a subterranean hydrocarbon-bearing reservoir by injection of a displacing fluid. More particularly, it relates to a more efficient method for hydrocarbon displacement and production by miscible flooding with a displacing fluid containing an additive.

2. Setting of the Invention

In the recovery of liquid hydrocarbons or crude oil from an underground reservoir, one known method involves injection into the reservoir of a fluid which is miscible with crude oil, i.e., the fluid acts as a solvent for crude oil, to displace the crude oil through the reservoir. When such fluids are employed, the term "miscible flooding" has been applied to the process.

Miscible flooding processes have been simulated in laboratory experiments. These processes have also been tested in hydrocarbon reservoirs, but field tests can only be observed at the surface since it is impossible to observe the fluid interactions in the reservoir. Based on laboratory simulations, several theories on miscible flooding have been postulated. The theories all depend on the belief that fluid behavior observed in the simulations occurs in an oil reservoir, even though this belief cannot be proved.

The process of miscible flooding is very effective in displacing trapped oil from the parts of the reservoir through which the fluid flows. It is thought that this effectiveness is derived from the fact that the oil retentive forces of capillary and interfacial tension are eliminated or substantially reduced by the fluid.

In miscible flooding a fluid is selected which is miscible with reservoir oil and is injected into the reservoir. This fluid displaces the oil through the reservoir towards a production well from which oil is produced. Exemplary fluids are light hydrocarbons and mixtures thereof such as paraffins in the $C_2-C_6$ range and, in particular, liquid petroleum gas (LPG). Use of such fluids, however, is often commercially impossible due to their expense.

Other fluids such as carbon dioxide or an enriched gas, which contains predominantly methane mixed with intermediate hydrocarbons such as ethane and propane, are both relatively inexpensive and have been used as displacing fluids for miscible flooding, even though carbon dioxide and enriched gas are not miscible with oil. After injection of either $CO_2$ or enriched gas, miscibility of the injected fluid with oil develops in the reservoir through successive multiple contacts between oil and the injected fluid. This desired miscibility of these fluids with reservoir oil can develop, however, only at pressures above a pressure known as the minimum miscibility pressure (MMP). It has thus been thought, based on determination of the MMP is slim tube displacement tests, that a miscible injection project could be performed where the reservoir pressure was above the MMP.

"Multiple Phase Generation During $CO_2$ Flooding," R. L. Henry, R. S. Metcalfe, SPE/DOE Symposium on EOR, Apr. 20-23, 1980, herein incorporated by reference, observes that during $CO_2$ flooding of a crude oil reservoir, over limited temperature, pressure, and composition ranges, mixtures of carbon dioxide and reservoir oil exhibit complex (multiple-phase) phase equalibria with more than two phases present in which a $CO_2$-rich vapor phase, a $CO_2$-rich liquid phase, an oil-rich liquid phase and, in some cases, a solid asphaltene phase, coexist in equilibrium. But the authors observed only two liquid phases in the phase equilibrium of $CO_2$ and reservoir oil at pressures higher than the pressure range exhibiting the multiple-phase phenomena.

One method for $CO_2$ flooding, U.S. Pat. No. 3,623,552, "Recovery of Oil by Low-Pressure Miscible Gas Injection," issued to J. Vairogs on Nov. 30, 1971, describes injection of $CO_2$ "at the conditions of temperature and pressure so that a three-phase equilibrium" exists between the $CO_2$ and reservoir oil. A difficulty with the Vairogs method is that such a three-phase equilibrium region exists only over a limited range of conditions, and there is no disclosure of how to perform a miscible displacement in the three-phase region in a reservoir whose pressure lies outside the pressure range over which the formation of multiple phases is exhibited.

In other methods, miscibility is achieved by injecting a mixture of $CO_2$ and either a light hydrocarbon or an inert gas, see U.S. Pat. Nos. 3,811,501, Burnett, et. al., "Secondary Recovery Using Carbon Dioxide and an Inert Gases," (Burnett I), and 3,811,503, Burnett, et al., "Secondary Recovery Using mixtures of Carbon Dioxide and Light Hydrocarbons," (Burnett II). Burnett I and II disclose determination of a critical ratio for the concentration of $CO_2$ to that of the hydrocarbon or inert gas, at which "conditional miscibility" may be attained. Neither patent discloses a method for miscible displacement with $CO_2$ at conditions within the multiple-phase region for a particular reservoir.

Applicants have found that when miscible flooding with a displacing fluid such as $CO_2$ is carried out at pressures falling within the multiple-phase region of the phase equilibrium of a particular reservoir's oil and the displacing fluid, the utilization of the displacing fluid is more efficient than in similar displacements at higher pressures. This is so even though at both pressure levels the displacement is miscible. However, the multiple-phase region of the phase equilibrium of a mixture often exists at pressures above or below the particular reservoir's pressure. Thus it may be impossible to perform a miscible displacement at a pressure within the multiple-phase region. The methods previously disclosed do not address this problem and do not disclose a method other than one which achieves minimum miscibility pressure with a displacing fluid-additive mixture. In accordance with this invention, a miscible displacement is performed with a displacing fluid in the multiple-phase pressure region at a particular reservoir's pressure.

SUMMARY OF THE INVENTION

The invention comprises a method for displacing hydrocarbons from a hydrocarbon-bearing reservoir by injecting into the reservoir a displacing fluid capable of generating at reservoir temperature and pressure conditions more than two fluid phases in a mixture of the reservoir hydrocarbons and the displacing fluid. The method is accomplished by injecting through an injection well into the reservoir the displacing fluid comprising a mixture of a primary fluid and an additive wherein the additive concentration is sufficient to adjust the phase equilibrium of a mixture of the displacing fluid with reservoir hydrocarbons. The additive's presence adjusts the phase equilibrium so that a multiple fluid phase region of the phase equilibrium will include a particular reservoir's temperature and pressure. Use of such a displacing fluid yields a more efficient displacement of oil. The primary fluid can be, for example, $CO_2$. The additive can be, for example, nitrogen, a hydrocarbon such as propane, or a fluid such as hydrogen sulfide.

DESCRIPTION OF THE INVENTION

Figure 1:
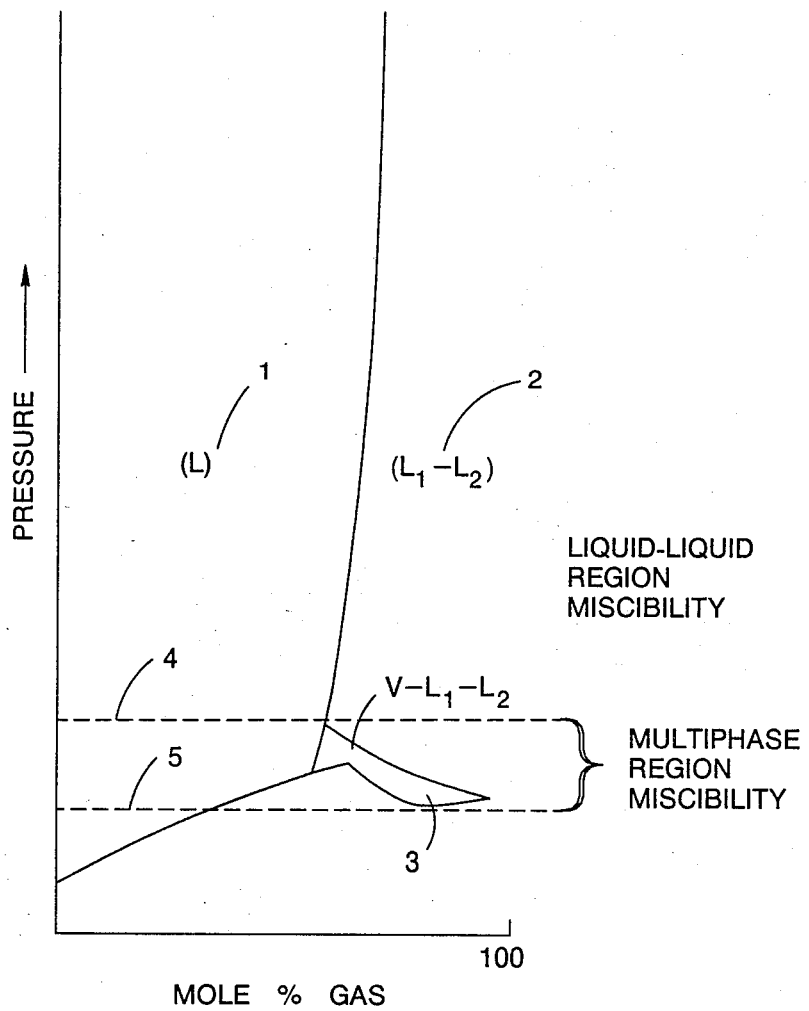
FIG. 1 shows a phase equilibrium of a mixture of $CO_2$ with hydrocarbons.

As illustrative of a phase equilibrium of a mixture of a displacing fluid with reservoir hydrocarbons, the phase equilibrium at constant temperature of a mixture of crude oil from the Levelland field in Texas and $CO_2$ is shown in FIG. 1. The phase equilibrium shows a liquid region 1, a liquid-liquid region 2, and a vapor-liquid-liquid region 3 (the multiphase region). As used herein, the terms multiple phase and multiphase indicate the existence of more than two fluid phases. These multiple fluid phases are in addition to a water phase usually present in a reservoir. The multiphase region 3 may also contain a solid asphaltene phase where the oil contains a significant amount of asphaltenes.

Displacements performed at pressures above the minimum miscibility pressure in the liquid-liquid region 2 of FIG. 1 are hereafter referred to as liquid-liquid displacements. Displacements performed at pressures in the multiphase pressure region 3 are hereafter referred to as multiphase pressure region displacements. Displacements at pressures above the MMP in the multiphase pressure region result in more efficient utilization of the injected displacing fluid, even though both displacements are miscible displacements. However, in contrast to the liquid-liquid pressure region, as is seen in FIG. 1, the multiphase pressure region exists only over a defined pressure range indicated by lines 4 and 5. The multiphase pressure region thus does not have to include a particular reservoir pressure, and a multiphase pressure region displacement is not possible in such reservoirs.

Figure 2:
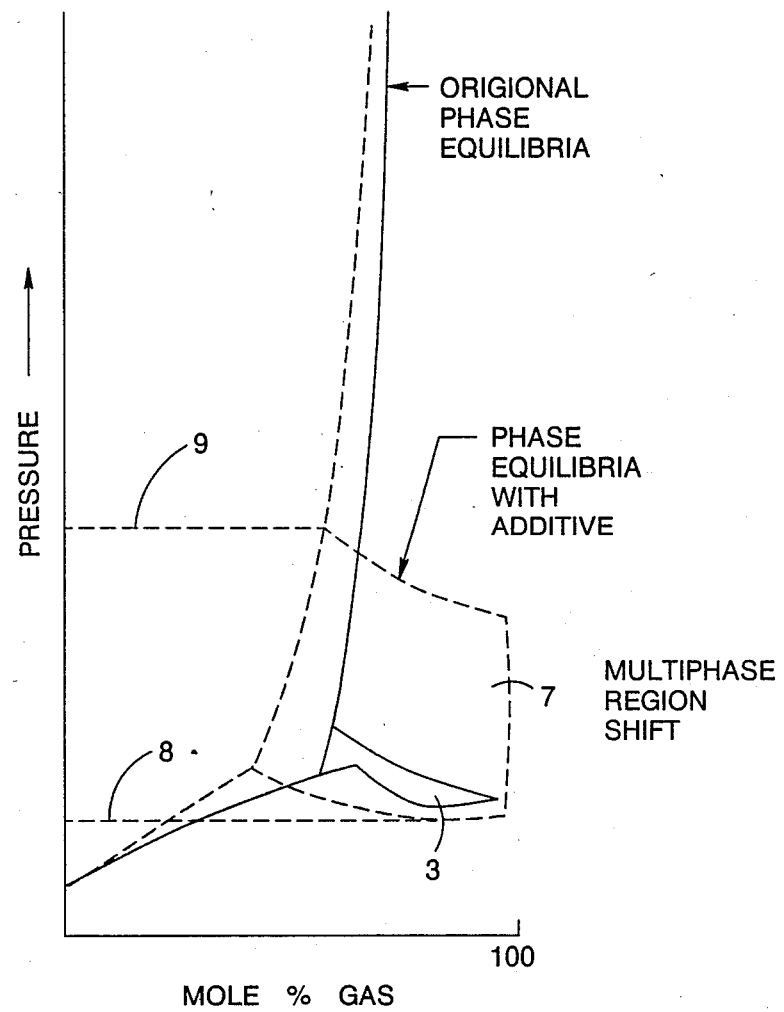
FIG. 2 shows adjustments in the phase equilibrium of a mixture of a displacing fluid with hydrocarbons induced by the presence of an additive in the displacing fluid.

However, the phase equilibrium of a mixture of $CO_2$ and crude oil can be adjusted or altered by including an additive with the $CO_2$. FIG. 2 shows the phase equilibrium at constant temperature of a mixture of $CO_2$ and the additive with Levelland crude oil. The equilibrium is altered so that the multiphase region 7 is now much larger than the original multiphase region 3. Hence, the multiphase region now exists at constant temperature over a broader pressure range, indicated by dotted lines 8 and 9, than the range for multiphase region 3 of a mixture of only $CO_2$ with oil. Although FIG. 2 shows an expansion of the multiphase region which is mainly upwards in pressure, it is also possible that a particular additive will alter the equilibrium so that the multiphase region 7 is mainly adjusted to exist at lower pressure levels than the original multiphase region 3.

The additive in a displacing fluid which comprises a primary fluid and the additive thus adjusts the phase equilibrium of a mixture of the displacing fluid with reservoir crude oil, and the phase equilibrium can be adjusted so that the pressure region over which multiple fluid phases exist encompasses a particular reservoir's pressure conditions. Injection of such a displacing fluid can miscibly displace hydrocarbons at a pressure level within the multiphase pressure region, thereby increasing the utilization of the injected displacing fluid.

The invention thus comprises displacing reservoir hydrocarbons by injecting into a hydrocarbon-bearing reservoir a displacing fluid which comprises a mixture of an additive and a primary fluid. The displacement is performed at a reservoir pressure which is within the multiple-phase pressure region of the phase equilibria of a mixture of the particular displacing fluid injected with the particular reservoir hydrocarbons. The primary fluid of the displacing fluid can be, for example, $CO_2$ or an enriched gas.

In the practice of the invention, the phase equilibrium of a mixture of an additive-containing displacing fluid with a particular reservoir crude oil should be determined. This is necessary because the desired concentration of additive in the displacing fluid is that concentration sufficient to adjust the multiphase region of the phase equilibrium to include a particular reservoir's pressure. The phase equilibrium is then analyzed to determine whether a sufficient adjustment is achieved. For each additive a range of additive concentrations sufficient to adjust the phase equilibrium can be present. This concentration range can be determined by noting first that a particular reservoir's temperature is constant, and second that only over a limited pressure range do multiple fluid phases exist at that temperature. Thus, all additive concentrations which, in a mixture of a displacing fluid with reservoir crude oil at a particular reservoir's temperature, can produce multiple phases at a pressure corresponding to the given reservoir's pressure are included in the concentration range. The concentration range can differ with each reservoir.

The additive concentration range can be determined by means of a slim-tube displacement test or a windowed cell apparatus, described in detail in the publication by Henry and Metcalfe referred to above. For example, in a slim-tube test, the displacing fluid is injected into a sand-packed and oil-filled tube and the produced fluid phases are monitored.

One complication of a hydrocarbon displacement process is that the process cannot be observed in situ, and must be studied through simulation in the laboratory. Thus, the multiple-phase behavior observed in laboratory tests and described above is believed to occur in a reservoir undergoing flooding by the method of the invention. However, for purposes of the invention it is immaterial whether multiple phases do in fact form in the reservoir when a displacing fluid according to the invention is injected. The invention is to inject a displacing fluid with an additive in a sufficient concentration to form multiple phases at reservoir conditions according to phase behavior observed on the surface under simulated conditions.

For each reservoir more than one additive can produce multiple phases at reservoir conditions. Each particular additive has its own concentration range, because each additive-containing displacing fluid has its own unique phase equilibria with reservoir oil. Thus, for a particular reservoir, the multiphase pressure range is not the same for different additive-containing displacing fluids. It accordingly follows that a choice of additives for adjusting the multiple phase region is usually available.

The selection of a particular additive for use in a chosen reservoir depends on other factors. The additive selected first depends on whether the pressure range over which multiple phases occur exists at pressures above or below the reservoir pressure. For example, where the multiphase region exists below the reservoir pressure and must be adjusted upward, those additives more volatile than the primary fluid, such as for example $CO_2$, are employed to adjust the region to encompass the reservoir pressure. Additives more volatile than $CO_2$ include, for example, methane, nitrogen, argon, and helium. If the multiphase region must be adjusted downward in pressure, an additive less volatile than $CO_2$, such as, for example, LPG or propane, is used. Other factors include availability, cost, separation procedures for a given additive from the produced crude, and other economic considerations.

Because a range of additive concentrations sufficient to adjust the phase equilibrium exists, more than one additive concentration can be used. This is an advantage of the invention since upsets within the reservoir and in the displacing fluid injection can occur with regularity. The displacement thus continues to be more efficient despite, for example, changes in the displacing fluid composition.

As a range of concentrations is available, the choice of the actual additive concentration to be used in the displacing fluid is based on considerations well-known to those skilled in the art. These considerations are the same as those referred to above for choosing the additive to be used.

Additives useful in the displacing fluid of the invention include, for example, hydrocarbons such as ethane, propane, LPG, butane and mixtures thereof; gases such as methane, nitrogen, flue gas, air, argon, helium and mixtures thereof; and other gases such as hydrogen sulfide and carbon monoxide. In general, any additive which can adjust the multiphase region of the phase equilibrium can be used.

The method of the invention is performed by injecting the displacing fluid comprising the primary fluid, such as, for example, either $CO_2$ or enriched gas, and an additive having a concentration sufficient to adjust the phase equilibrium into a hydrocarbon-bearing subterranean reservoir traversed by at least one injection well. $CO_2$ is preferred as the primary fluid of the invention because of its lesser cost and its phase equilibrium effect. The amount of displacing fluid injected must be an effective amount to sweep the reservoir. Such an amount is easily determined by one skilled in the art and is engineered for a particular reservoir. After displacement to a production well penetrating the formation, the oil is produced, and separated from additive/$CO_2$ present. The additive/$CO_2$ can then be reinjected.

In one embodiment of the invention, after injecting the displacing fluid mixture, the method continues by injecting a drive fluid to drive the displacing fluid and mobilized oil through the reservoir towards a production well from which the oil is produced. The drive fluid can be any relatively inexpensive fluid, including gases such as air, nitrogen, combustion or flue gases, or mixtures thereof. The drive fluid can also be water or brine and can contain additives such as a surfactant to maintain efficient displacement with the drive fluid. The amount of drive fluid injected is an amount sufficient to displace mobilized hydrocarbons through the formation to the producing well. However, it is not necessary to the invention to inject the drive fluid because a continuous injection of the additive-containing displacing fluid can be used.

Where the drive fluid is water or brine, the invention has the advantage of reducing water injectivity loss experienced in alternating displacing fluid-water injection processes. This feature is disclosed and claimed in Applicants' copending Application, "Reducing Injectivity Losses During Displacing Fluid Injection Processes", Ser. No. 510,798, now abandoned, filed herewith and incorporated by reference.

In a preferred aspect, the displacing fluid and drive fluid are injected in alternating cycles. It is preferred to do this by injecting about 1 to about 5 percent of the reservoir pore volume of the displacing fluid, followed by injecting about 1 to about 5 percent of reservoir pore volume of drive fluid, and repeating this injection sequence.

The following examples are provided to demonstrate the use of the invention.

EXAMPLE I

An oil-bearing reservoir in the Levelland field in West Texas has a reservoir pressure of 1900 psig and a temperature of 106° F. Oil from this reservoir was subjected to slim-tube tests with $CO_2$ and $CO_2$-additive mixtures. The minimum pressure required for miscible displacement (the MMP) of the Levelland oil by pure $CO_2$ at 106° F. was determined to be 1175 psig. The maximum pressure at which multiple phases were observed with $CO_2$ is 1600 psig. Thus, without employing the invention, a miscible displacement in the multiple phase pressure region cannot be performed at reservoir conditions.

When $CO_2$ was admixed with nitrogen such that the $CO_2$/nitrogen mixture contains 10 mole percent nitrogen, the MMP is 1600 psig, the minimum pressure at which multiple phases were observed was 1600 psig, and the maximum pressure at which multiple phases were observed was 3400 psig. This shift in the phase equilibrium induced by the additive is similar to that illustrated in FIG. 2. The expanded multiphase region, due to the additive, shifts upward in pressure and also increases from a pressure range of 425 psi to 1800 psi.

EXAMPLE II

A core test comparison of oil displacement was made between injection of $CO_2$ and of a 90 mole percent $CO_2$/10 mole percent $N_2$ mixture. The tests were performed in an 8-foot long, 2-inch diameter Berea core saturated with Levelland crude oil, and maintained at 106° F. and 1900 psi. Injection of $CO_2$ resulted in $CO_2$ breakthrough at 0.45 pore volume of fluid injected and oil recovery of 68% after 1.2 pore volumes of fluid were injected. Injection of the $CO_2$/$N_2$ mixture gave $CO_2$ breakthrough at 0.68 pore volume of injected fluid and oil recovery of 74.6% after 1.2 pore volumes of injected fluid.

From Example I, it is seen that a displacing fluid containing a mixture of $CO_2$ and nitrogen at a concentration of 10 mole percent nitrogen results in expansion of the defined range of pressures at a constant temperature over which multiple-phase phenomena of mixtures of a given oil and the displacing fluid occur. The addition of the additive to the primary fluid, $CO_2$ in this example, consequently permits flooding of the Levelland reservoir under multiple-phase conditions which was previously not possible. From Example II, it is seen that injection of an additive/$CO_2$ displacing fluid mixture capable of producing a multiphase region at reservoir conditions improves efficiency of the $CO_2$ utilization. Further, use of the invention lessens the need for early separation treatment of the produced fluids because the $CO_2$ of displacing fluid breakthrough is delayed.

It is intended that the scope of the invention not be restricted to that described herein, as the description is meant to be only illustrative. Rather, its scope is given by the following claims. As noted above, the claims should be interpreted as describing the fluid behavior that occurs under simulated laboratory conditions, as is common in this technology.

We claim:

1. A method for the displacement of hydrocarbons through a liquid hydrocarbon-bearing subterranean reservoir having a temperature and pressure such that a mixture of the liquid hydrocarbon and $CO_2$ or enriched gas primary fluid does not form a multiphase region at said temperature and pressure and being penetrated by at least one injection well to displace hydrocarbons comprising:

injecting into the reservoir through the at least one injection well a displacing fluid comprising said primary fluid and at least one additive in an amount sufficient that a mixture of the liquid hydrocarbon and displacing fluid form a multiphase region at the temperature and pressure of the reservoir;

and displacing the displacing fluid through the reservoir, thereby forming a mixture of the liquid hydrocarbon and displacing fluid in the reservoir having multiple phases and displacing liquid hydrocarbons through the reservoir.

2. The method of claim 1 wherein said additive is selected from the group consisting of inert gases and mixtures thereof, hydrocarbon gases and mixtures thereof, hydrogen sulfide, carbon monoxide, and mixtures thereof.

3. A method of claim 1 further comprising:
   (a) injecting a drive fluid into the reservoir through the injection well following the injection of the displacing fluid to drive hydrocarbons through the reservoir toward a production well; and
   (b) producing hydrocarbons from the production well.

4. The method of claim 3 wherein said drive fluid is selected from the group consisting of air, nitrogen, combustion gas, carbon dioxide, and hydrocarbons.

5. The method of claim 1 wherein the primary fluid is $CO_2$.

6. The method of claim 5 wherein the additive is nitrogen.

7. The method of claim 5 wherein the additive is more volatile than $CO_2$.

8. The method of claim 5 wherein the additive is less volatile than $CO_2$.

* * * * *